United States Patent [19]

Schmitz et al.

[11] Patent Number: 4,676,560
[45] Date of Patent: Jun. 30, 1987

[54] CIRCULATING RACK

[75] Inventors: Joachim Schmitz, Brühl; Franz Wagner, Bobenheim-Roxheim; Adrian Siegler, Rulzheim, all of Fed. Rep. of Germany

[73] Assignee: Bellheimer Metallwerk GmbH, Fed. Rep. of Germany

[21] Appl. No.: 825,808

[22] Filed: Feb. 4, 1986

[30] Foreign Application Priority Data

Feb. 8, 1985 [DE] Fed. Rep. of Germany ....... 3504751

[51] Int. Cl.⁴ .......................... A47F 3/08; B65G 43/02
[52] U.S. Cl. .................................... 312/268; 198/794; 198/856; 211/1.5; 211/121
[58] Field of Search ........................ 198/794, 810, 856; 312/134, 266, 267, 268; 211/1.5, 121

[56] References Cited

U.S. PATENT DOCUMENTS

| | | | |
|---|---|---|---|
| 2,940,810 | 6/1960 | Graber | 312/268 |
| 3,720,451 | 3/1973 | Anders | 312/268 |
| 4,175,657 | 11/1979 | Dehne et al. | 198/856 X |

Primary Examiner—Jeffrey V. Nase
Attorney, Agent, or Firm—Mark P. Stone; F. Eugene Davis, IV

[57] ABSTRACT

The present invention provides a circulating rack having an electric drive which can be pivoted, to a limited degree, in opposed directions dependent upon the transmitted torque of the electric drive. The drive is mounted on a pivotal rocker element which is displaced against the force of two counteracting elastically deformable abutments. A torque transmitted by the electric drive to overcome non-uniform loading of the circulating rack system causes the pivotal rocker to be displaced in either a clockwise or counterclockwise direction. A displacement measuring sensor measures the extent of pivotal movement of the rocker to provide an indication of the non-uniform loading condition so that corrective action may be taken. If the rocker is pivoted beyond a predetermined range, as for example that caused by a severe overloading condition, the displacement measuring sensor will cause the electric drive to turn off and prevent further circulation of the system until the overload has been corrected.

7 Claims, 7 Drawing Figures

CIRCULATING RACK

BACKGROUND OF THE INVENTION

The invention relates to a circulating rack having a plurality of load bearers which are used for accommodating objects to be stored and can be moved along a closed path by a chain driven by an electric drive.

In such circulating racks, the user is interested in recognizing whether the rack is loaded unequally or even excessively. The object of the invention is to take into account the abovementioned interest and, by a special type of suspension of the drive motor for the rack, to create the preconditions for a simple detection of the loading condition of the rack. In a circulating rack of the generic type described at the beginning, this object is achieved according to the invention in that the electric drive is mounted such that it can be pivoted by limited amounts against the force of at least one elastically deformable abutment, and that at least one displacement-measuring or angle-measuring or force-measuring sensor and/or a limiting-value sensor is provided for detecting or limiting the pivot movements dependent on the transmitted torques of the electric drive.

SUMMARY OF THE INVENTION

The circulating rack according to the invention offers considerable advantages. Unsymmetric loads can be recognized and subsequently eliminated. Even overloading of the rack can be prevented by the sensor being adjusted in such a way that it prevents starting of the electric motor during overloading. Moreover, the guarantee is provided that the electric drive is automatically switched off in the event of disturbances, for example seizing as a result of a broken component. Finally, the elastically deformable abutments compensate jerky motions as chiefly occur during the starting of the load bearers of circulating racks driven by a direct-current motor

BRIEF DESCRIPTION OF THE DRAWINGS

Further details and features of the invention follow from the subclaims and the description below of two illustrative embodiments shown in the attached drawing, in which:

DESCRIPTION OF THE PREFERRED EMBODIMENTS OF THE INVENTION

Figure 1:
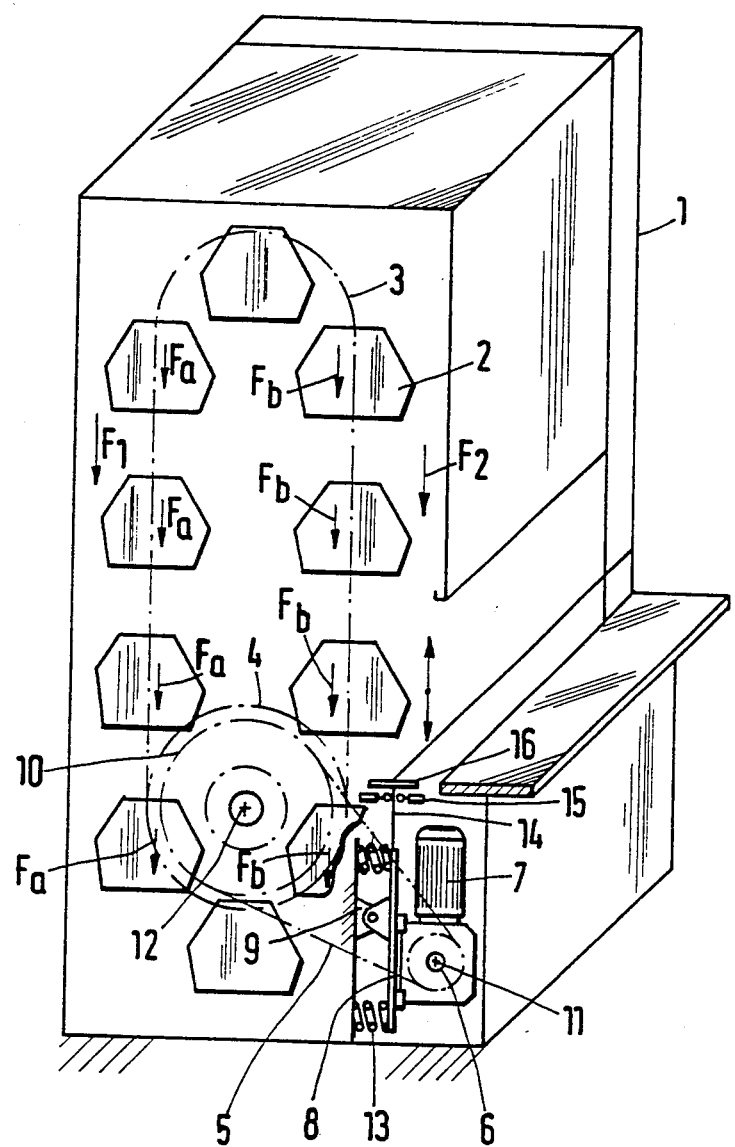
FIG. 1 shows the view, made highly diagrammatic, of a first circulating rack.

Designated 1 in FIG. 1 is the housing of a circulating rack equipped with several load bearers 2. A closed chain 3 is used for driving the load bearers 2 along a path, which chain 3 is directly connected to the individual load bearers, which are guided in guides (not shown). In the illustrative embodiment shown, the drive chain wheel 10 for the chain is connected to the output shaft 6 of the electric drive 7, designed as a geared motor, via a drive chain 5, and in fact via a chain wheel fixed on the output shaft 6. The electric drive 7 is mounted on a rocker 8 which is pivotable about the fulcrum 9. In the illustrative embodiment according to FIG. 1, the fulcrum 9 of the rocker 8 is located outside the longitudinal axis 11 of the output shaft 6 of the electric drive 7.

In the illustrative embodiment shown, the rocker 8 is designed as a double-arm lever, the ends of which are supported by elastic abutments 13 formed by spring elements. An extension arm 14 and two-way switch which acts as a limiting-value sensor 15 are allocated to the rocker 8.

The forces $F_a$ of the left-hand part of the chain 3 form a resultant $F_1$ and forces $F_b$ of the right-hand part form a resultant $F_2$. In a uniformly loaded circulating rack, the forces $F_1$ and $F_2$ are equal, that is, the torque to be applied by the electric drive 7 is small. If $F_1$ deviates from $F_2$, the electric drive 7 must apply an additional torque to overcome the differential force. If the differential force is very large, the rocker 8 executes a pivoting movement about its fulcrum 9, which pivoting movement is so large that contact occurs between the rocker 8 and the two-way switch 15. If this case occurs, the motor 7 is automatically switched off. In other words, the two-way switch 15 forms a limiting-value sensor which can be adjusted to the maximum permissible "deviant load".

Figure 2:
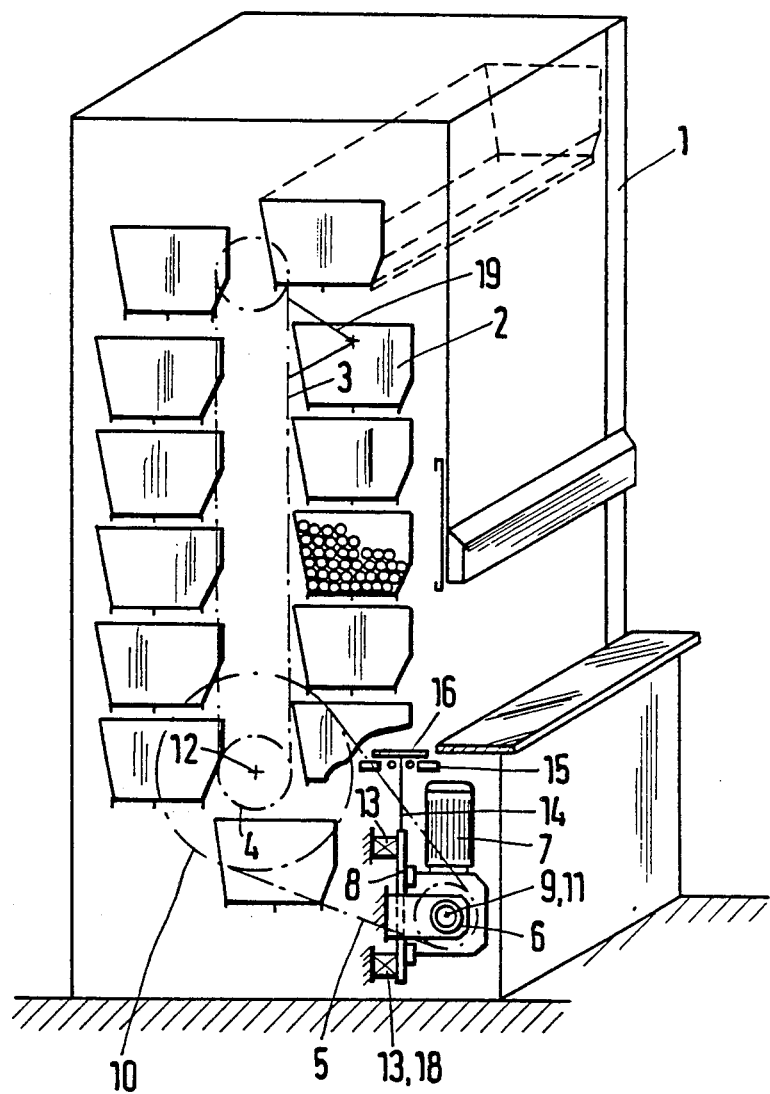
FIG. 2 shows the view, also made highly diagrammatic, of a second circulating rack.
Figure 3:
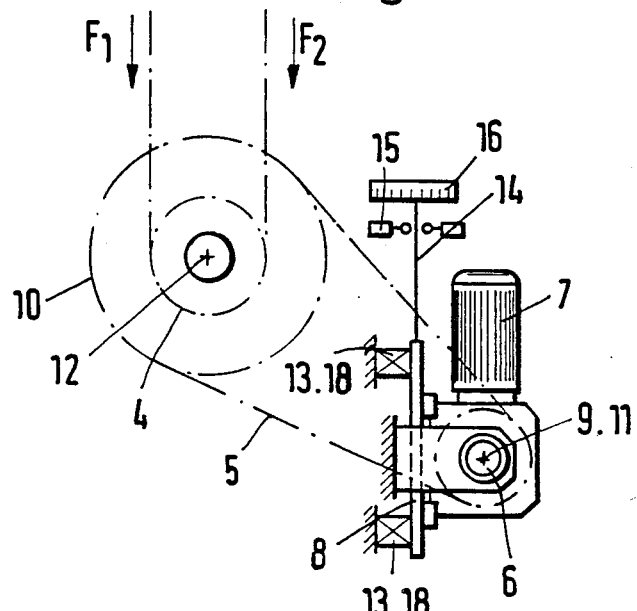
FIG. 3 shows the motor suspension of the circulating rack according to FIG. 2, to an increased scale.
Figure 4:
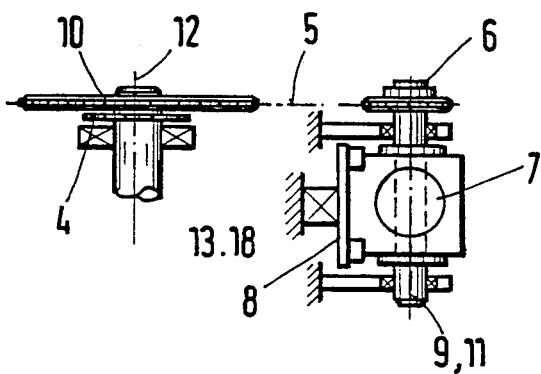
FIG. 4 shows a plan view of the parts shown in FIG. 3.

The construction of the circulating rack shown in FIGS. 2 to 4 essentially corresponds to the construction of the circulating rack according to FIG. 1, apart from the fact that the load bearer 2 is indirectly connected to the load chain 3 via bearer arms 19. The same reference numerals have therefore been used for the same parts. In this variant, unlike in the first illustrative embodiment, the fulcrum 9 of the rocker 8 and the longitudinal axis 11 of the output shaft 6 coincide. This is a particularly advantageous solution, because the drive chain 5 continually maintains its position. A further difference between the two designs is that, in the second circulating rack, force-measuring sensors 18 are added to the abutments 13 formed by spring elements, which force-measuring sensors 18 enable the imbalance of the load condition to be indicated.

Figure 5:
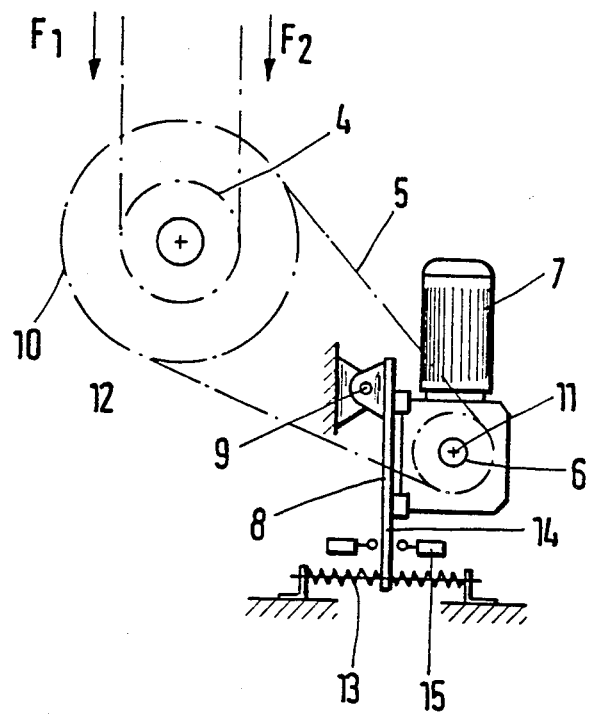
FIG. 5 shows a modified motor suspension.

Finally, a further illustrative embodiment of a motor suspension is shown in FIG. 5. In this case, a rocker 8 is used which is designed as a single-arm lever, the extension arm 14 of which interacts with the switch 15. In addition, the extension arm is guided between abutments 13 formed by spring elements. The springs can be embedded in rubber and thus act at the same time as damping elements. Such a solution offers particular advantages when using an electric drive 7 having a direct-current motor. As known, when switching on a direct-current motor, it reaches its rated speed virtually immediately. This leads to jerky starting movements of the load bearers and the stored material in the curve area. The jerky movements are counteracted by the damping.

Figure 6:
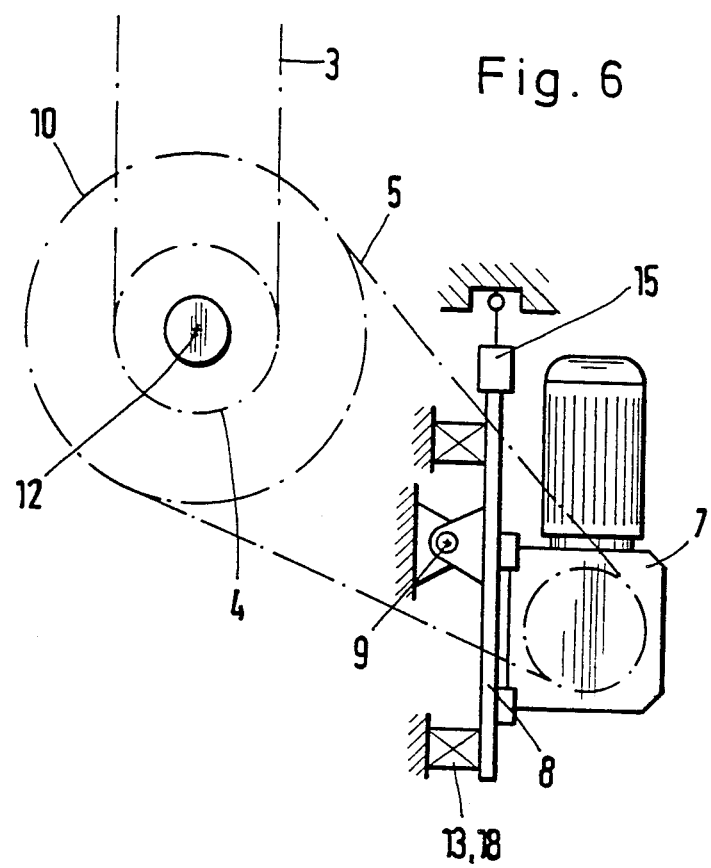
FIG. 6 shows the motor suspension of the circulating rack according to FIG. 1, to an increased scale and with modified representation of the damping arrangement, force-measuring sensors and limiting-value sensors.

FIG. 6 is a further variant of a limiting-value sensor 15. In this variant, a two-way switch is fixed to the rocker 8. If the rocker 8 moves about the fulcrum 9 to such an extent that the limiting-value sensor 15 makes contact with the limiter, the motor is automatically switched off.

Figure 7:
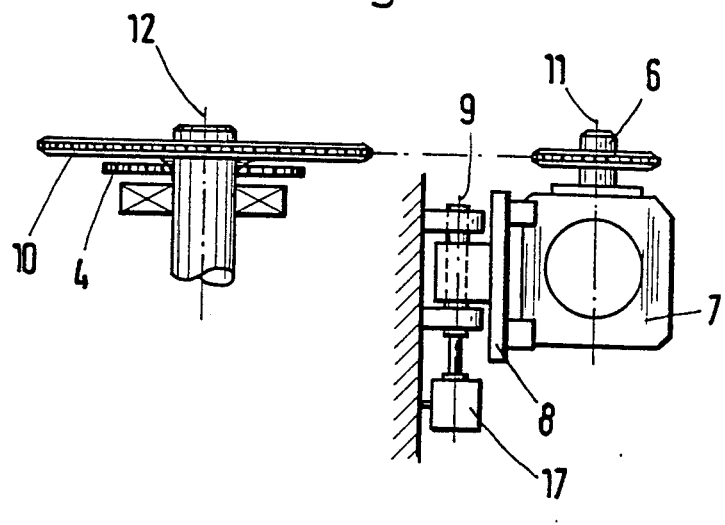
FIG. 7 shows a plan view of the parts shown in FIG. 6, together with a possible allocation of an angle-measuring sensor.

FIG. 7 represents a further possibility of detecting the measured value for determining the imbalance. The motor rocker 8 is mounted in the fulcrum 9. The axis of rotation of the motor rocker is firmly connected to the rocker 8. An angle-measuring sensor 17 is allocated to the end of the rocker axis, which angle-measuring sensor 17 can detect the rotational movement of the shaft. The measuring signal can be evaluated for indicating the imbalance, for indicating the direction of the imbalence, for indicating overloading and for indicating a fracture defect.

We claim:

1. Circulating rack having a plurality of load bearers which are used for accommodating objects to be stored and can be moved along a closed path by a chain driven by an electric drive, characterized in that the electric drive is mounted on a rocker such that it can be pivoted in opposed directions against the force of two counteracting elastically deformable abutments, and displacement measuring sensor means for indicating and limiting the pivotal movement of the rocker in either of said opposed directions, said rocker being displaced in one of said opposed directions depending upon the transmitted torque of the electric drive.

2. Circulating rack according to claim 1, characterized in that force-measuring sensors (18) are used for supporting the rocker (8).

3. Circulating rack according to claim 1, characterized in that spring or resilient damping elements (13) are used for supporting the rocker (8).

4. Circulating rack according to claim 1, characterized in that the displacement measuring sensor means includes a switch (15) acting in two directions.

5. Circulating rack according to claim 1 characterized in that an output shaft (6) of the electric drive (7) is connected via a drive chain (5) to a chain wheel (10) for driving a chain (3) for the load bearers (2).

6. Circulating rack according to claim 1, characterized in that the fulcrum (9) of the rocker (8) is located on the longitudinal axis (11) of the output shaft (6) of the electric drive (7).

7. Circulating rack according to claim 1, characterized in that the fulcrum (9) of the rocker (8) is located outside the longitudinal axis (11) of the output shaft (6) of the electric drive (7).

* * * * *